United States Patent

Dequesnes

[11] Patent Number: 5,857,547
[45] Date of Patent: Jan. 12, 1999

[54] ANNULAR PRESSURE PLATE FOR A FRICTION CLUTCH, ESPECIALLY FOR A MOTOR VEHICLE

[75] Inventor: Laurent Dequesnes, Fouilloy, France

[73] Assignee: Valeo, Paris, France

[21] Appl. No.: 752,942

[22] Filed: Nov. 21, 1996

[30] Foreign Application Priority Data

Nov. 22, 1995 [FR] France ................................ 95 13839

[51] Int. Cl.⁶ .................................................. F16D 13/72
[52] U.S. Cl. .................................... 192/70.12; 192/113.23
[58] Field of Search ........................... 192/70.12, 113.23, 192/113.2, 113.21, 89.23, 89.24

[56] References Cited

U.S. PATENT DOCUMENTS 3,385,412  5/1968  Isgren .
4,294,343 10/1981  Reh ..................................... 192/113.23
4,560,048 12/1985  Flotow et al. ........................ 192/70.12
4,699,259 10/1987  McColl ................................. 192/70.12
4,865,174  9/1989  Takeuchi .............................. 192/70.12
5,072,816 12/1991  Takeuchi et al. .................... 192/70.12

FOREIGN PATENT DOCUMENTS 85-12194  8/1985  Germany .

Primary Examiner—Rodney H. Bonck
Attorney, Agent, or Firm—Longacre & White

[57] ABSTRACT

A pressure plate for a dry friction clutch has a central hole with a set of ventilating fins formed on its inner periphery.

6 Claims, 2 Drawing Sheets

ANNULAR PRESSURE PLATE FOR A FRICTION CLUTCH, ESPECIALLY FOR A MOTOR VEHICLE

FIELD OF THE INVENTION

The present invention relates to pressure plates for dry friction clutches, especially for motor vehicles, of the kind in which the pressure plate is annular, that is to say it is generally in the form of a ring defining a central hole.

BACKGROUND OF THE INVENTION

A conventional friction clutch has at least one pressure plate and a reaction plate, each of which is formed with a machined, generally transverse friction surface, together with a clutch friction wheel or friction disc carrying friction liners. The friction liners are gripped between the friction surfaces of the pressure and reaction plates when the clutch is engaged, which is the normal condition of the clutch.

In a clutch for a motor vehicle having an internal combustion engine, the engine torque is transmitted via the pressure and reaction plates, to the friction disc which is mounted on the input shaft of the gearbox for rotation with it. Both the pressure plate and the reaction plate are mounted on the engine crankshaft for rotation with the latter.

The clutch pedal, operated by the driver of the vehicle, actuates a declutching fork, which in turn operates a clutch release bearing for disengaging the clutch. The clutch release bearing acts in either a thrust (or pushing) mode or a pulling mode. In both cases it is engaged on the ends of the fingers of the clutch diaphragm. The clutch also includes a cover plate fixed to the reaction plate, while the pressure plate has a generally transversely oriented back face. The diaphragm bears on the cover plate and on the back face of the pressure plate, so as to urge the latter towards the clutch friction wheel, whereby the friction liners are gripped between the respective friction surfaces of the pressure and reaction plates.

Thus, when the clutch release bearing is engaged on the diaphragm, it cause the latter to pivot and so relieves the pressure plate of the force normally exerted by the diaphragm. In this way, the pressure plate is displaced axially towards the base of the cover plate. Resilient tongues couple the pressure plate to the cover plate, in such a way that the pressure plate and cover plate rotate together but are capable of relative axial movement.

The travel of the clutch bearing during the declutching operation takes place in two stages, namely an approach stage, at the end of which the friction liners come into kissing engagement with the friction surfaces of the pressure and reaction plates; and a modulation stage, during which the liners are progressively gripped between the associated friction surfaces. During the modulation stage, there is rotational friction between the liners and the friction surfaces, which tends to polish the liners and which causes heat to be produced. The clutch may be part of an automatic transmission, in which the operations of engaging and disengaging the clutch are controlled by an actuator which actuates the clutch release bearing, and which is itself governed by a computer in response to, for example, the speeds of rotation of the engine crankshaft and the gearbox input shaft. In an application of this kind, the friction liners may be deliberately polished beforehand, in order to improve absorption of vibration in a predetermined running mode of the engine, corresponding for example to the natural frequency.

Whether or not the clutch is part of an automatic transmission, not only the liners themselves, but also the pressure and reaction plates and the friction discs all tend to become heated.

Moreover, under severe conditions, for example following a series of consecutive hill starts of the vehicle, it is found that the pressure plate assumes a conical shape under the effect of this heating.

It is therefore desirable to provide means for cooling the pressure plate itself, as well as the friction disc with its liners.

U.S. Pat. No. 3,385,412 disclosed cooling of the friction disc and the pressure plate with the aid of a coolant liquid. With such an arrangement, the clutch is no longer a dry clutch. Such an arrangement involving a coolant liquid is costly, and requires considerable modification of the clutch.

In the context of a clutch which operates dry, it has also been proposed to provide the back face of the pressure plate, i.e. the face opposite to the face on which the friction surface of the pressure plate is defined, with a set of ventilating fins whereby the pressure plate, and to a lesser extent the friction disc and its liners, can be cooled.

DISCUSSION OF THE INVENTION

The problem remains of providing improved ventilation, in order to provide efficient cooling of both the pressure plate and the friction disc of a dry friction clutch, in a simple and inexpensive way. It is an object of the invention to provide a solution to this problem.

According to the invention, a pressure plate having a central hole, for a dry friction clutch, in particular for a motor vehicle, in which the pressure plate includes a back face for action of axially acting resilient means (such as a diaphragm) thereon, and a friction surface for cooperating with a friction disc, is characterised in that the inner periphery of the pressure plate is provided with radially inwardly directed ventilating fins.

This arrangement enables a stream of air to flow from the back face of the pressure plate towards its friction surface in such a way that the friction disc and the reaction plate are both cooled. In this connection it should be noted that the reaction plate has the above mentioned tendency to assume a conical form, though to a lesser extent than the pressure plate. It will be understood that the pressure plate is efficiently ventilated, and therefore cooled, in the arrangement according to the invention. Thus, in general, the ventilation and cooling of the clutch as a whole are improved, and this improvement is obtained in a simple and inexpensive way because the said ventilating fins can easily be formed integrally with the pressure plate, the latter being in the form of a moulding or casting. In addition, the location of these fins at the inner periphery of the pressure plate enables the number of such fins to be made quite high. In this connection, the number of these fins may be greater than the number of the ventilation ribs which are incorporated in the pressure plate itself: these ventilation ribs are distinct from the ventilating fins which are provided in accordance with the invention on the inner periphery of the annular pressure plate.

According to a preferred feature of the invention, the said ventilating fins are spaced apart circumferentially at regular intervals, and define air flow channels between them. These fins may be of symmetrical form, and/or they may have a rectangular cross section with rounded corners. Alternatively, they may have a lozenge-shaped cross section. The ventilating fins are preferably in the form of pads having a width greater than their radial depth.

The pressure plate preferably has ventilating ribs on its back face, the number of the said ventilating fins being greater than the number of the said ventilation ribs.

The various features and advantages of the invention will be understood better on a reading of the following detailed description of a prior art clutch and a clutch according to the invention, the latter being in a preferred embodiment given by way of example only, and the description being made with reference to the accompanying drawings.

DESCRIPTION OF A PREFERRED EMBODIMENT OF THE INVENTION

Figure 1:
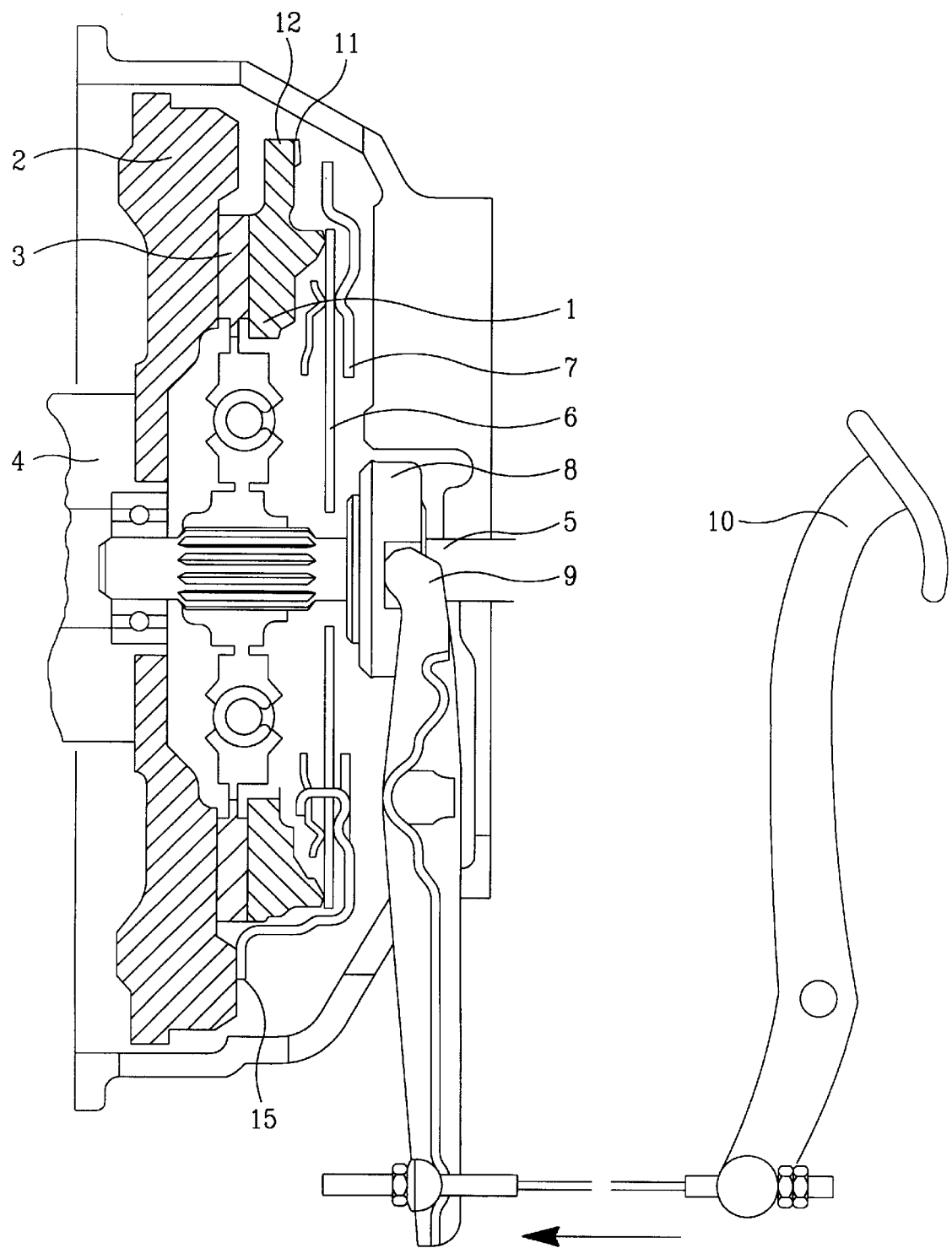
FIG. 1 is a diagrammatic view of a clutch of the prior art, shown in axial cross section.

Reference is first made to FIG. 1, showing a typical prior art dry friction clutch of the kind described earlier herein. In FIG. 1, the clutch comprises at least one pressure plate 1 and a reaction plate 2, each of which has a machined, generally transverse, friction surface for gripping between these two surfaces the friction liners of a friction disc, or clutch friction wheel, 3. The clutch is of the normally engaged type, such that, in the context of application of the clutch to a motor vehicle, the torque produced by the internal combustion engine of the vehicle is transmitted via the pressure plate 1 and reaction plate 2, which are mounted on the crankshaft 4 of the engine for rotation with it, to the friction disc 3 and thence to the input shaft 5 of the gearbox of the vehicle. For this purpose, the friction disc 3 has a hub which is mounted on the gearbox input shaft 5 by means of cooperating splines formed internally on the hub and externally on the shaft 5.

A clutch release bearing 8, which is controlled by a declutching fork 9, is operated by the clutch pedal 10. In order to disengage the clutch, the clutch release bearing is applied, in either a thrust mode or a pulling mode, on the ends of the fingers of a diaphragm 6 of the clutch, which bears on a cover plate 7 of the clutch. The cover plate 7 is fixed to the reaction plate 2. The diaphragm 6 also bears on the generally transversely oriented back face of the pressure plate 1, so that in its normal state, the diaphragm urges the pressure plate 1 axially towards the reaction plate 2. The friction liners of the friction disc 3 are thus gripped between the above mentioned friction surfaces of the pressure and reaction plates.

More particularly, the declutching force exerted by the clutch release bearing 8 on the diaphragm 6 causes the latter to pivot, and so causes it to cease acting on the pressure plate 1, thus enabling the latter to be urged towards the base of the cover plate 7 by a set of resilient tongues 11. These tongues 11 couple the pressure plate 1 to the cover plate 7 for rotation together. The tongues 11 are fixed to a set of projecting ears 12 of the pressure plate 1. This coupling together of the pressure plate and cover plate permits the necessary relative axial movement to take place between them. The clutch is now disengaged, and in order to re-engage it, the clutch pedal 10 is released, thereby releasing the clutch release bearing 8 from the diaphragm 6, which thereupon returns the pressure place to its normal position with the friction wheel 3 gripped between the plates 1 and 2.

In the first or approach stage of the axial travel of the clutch release bearing during declutching, mentioned above, the clutch release bearing 8 and the diaphragm 6 pass from the disengaged position of the clutch to a position in which the friction liners of the friction disc 3 just kiss the friction surfaces of the pressure and reaction plates, i.e. in this position the liners are only just in contact with the friction surfaces.

During the second or modulation stage in which the liners are progressively gripped between the friction surface of the plate 1 and that of the plate 2, until the liners are firmly gripped between these friction surfaces, relative rotation causes the liners to become polished by friction, and this gives rise to heating, as defined above, of the pressure plate 1, reaction plate 2, and friction disc 3.

Figure 2:
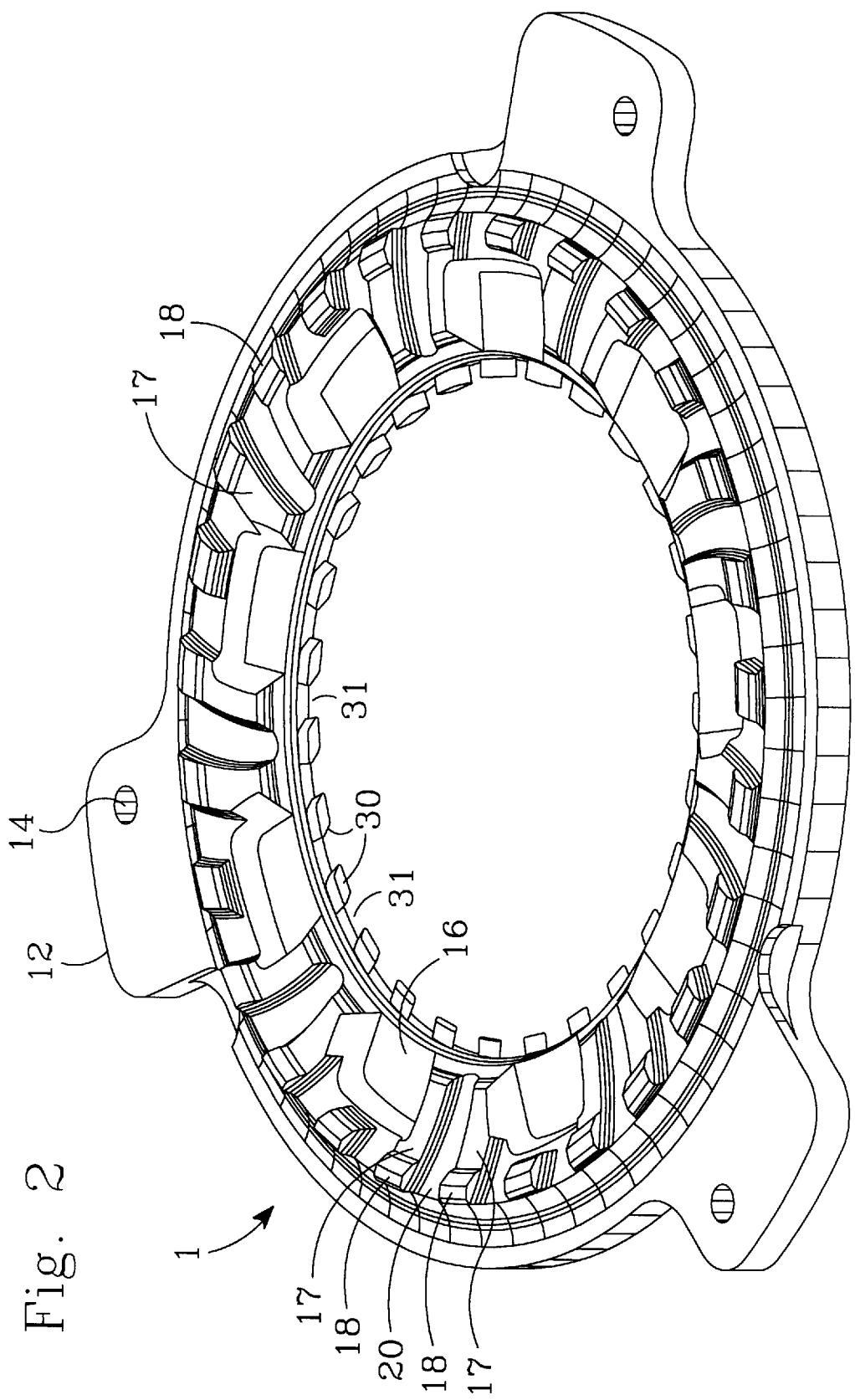
FIG. 2 is a perspective view of a reaction plate in the said preferred embodiment of the invention.

The specific embodiment of a clutch in accordance with the present invention is constructed generally as described above with reference to FIG. 1, except that the pressure plate is replaced by a pressure plate in accordance with the invention, a preferred version of which is shown in FIG. 2, to which reference will now be made.

Accordingly, FIG. 2 shows an annular pressure plate 1 for a dry friction clutch. The plate 1 has a central hole and a circular inner. The pressure plate 1 has three ears 12, projecting radially at its outer periphery, for mounting the tongues 11 of FIG. 1, so coupling the pressure plate 1 to the cover plate 7 for rotation together but for relative axial movement. Each ear 12 has a hole 14 for fastening the members that secure the tongues 11 to the pressure plate 1. Usually these fastening members consist of rivets. The tongues 11 are thus secured at one of their ends to the ears 12, the latter being in this example spaced apart circumferentially at regular intervals. The radial fastening flange 15 (FIG. 1) of the cover plate 7, whereby the cover plate is fastened to the reaction plate 2, has, in a manner known per se, portions to which the other ends of the tongues 11 are fastened. This fastening is here provided by screws, not shown.

The back face 16 of the pressure plate 1, on the opposite side of the latter from the friction surface of the pressure plate, is formed with ventilation ribs 17 which are configured with axially projecting elements 18. The ventilation ribs 17 extend generally from the inner periphery to the outer periphery of the pressure plate 1. They are of a generally inclined configuration, and are curved. Grooves 20 are defined between the ventilation ribs 17. Some of the ventilation ribs 17, spaced apart circumferentially at regular intervals, consist only of the projecting elements 18. In this example the projecting elements 18 are of pointed form as shown, so defining a discontinuous arcuate contact line for contact with the diaphragm 6.

In the present case, the clutch is of the push-to-release type, in which the clutch release bearing 8 (FIG. 1) acts in a thrust mode on the fingers of the diaphragm 6, for the purpose of releasing the friction liners of the friction disc 3 from the friction surfaces of the pressure and reaction plates. Accordingly, the diaphragm 6 is mounted pivotally on the radial base portion (which has a central hole) of the cover plate 7, which is in the form of a hollow dish.

In FIG. 1, the inner periphery of the resilient, radially outer, portion (in the form of a Belleville ring) of the diaphragm 6 is pivoted between a primary abutment, formed by stamping in the base of the cover plate 7, and a secondary abutment which consists of a projecting element of a crown ring attached to the cover plate 7 by means of a assembly lugs, the free end portion of each of which is bent radially outwardly so as to define a locating bend for the crown ring, all of this being conventional.

The assembly lugs are formed by stamping and bending in the base of the cover plate 7. The outer periphery of the Belleville ring of the diaphragm 6 bears on the back face 16 of the pressure plate 1, and more precisely on the projecting elements 18 of the latter, thus urging the pressure plate 1 towards the reaction plate 2 for the purpose of gripping the friction liners of the friction disc 3 between the pressure and reaction plates.

The ribs 7 constitute ventilating fins, so that the generally transversely oriented back face 16 of the pressure plate 1 is ventilated by a permanent stream of air while the clutch is in rotation.

In order to improve the ventilation of the clutch, the pressure plate 1 has at its inner periphery a set of ventilating fins 30 which project radially inwardly. These fins 30 are spaced apart circumferentially at regular intervals. In this example there are twenty-seven of the fins 30, and it should be noted that this number is greater than the number of the ventilation ribs 17, although this does of course depend on the particular application. In the present case, all of the fins 30 are identical with each other, and they define between them air flow channels 31. The friction disc 3 is therefore ventilated by virtue of the fact that the fins 30 set up a stream of air from the back face 16 of the pressure plate 1 to its front face on which its friction surface is formed.

When the clutch is disengaged, air is able to flow between the friction liner of the friction disc 3 which is adjacent to the friction surface of the pressure plate 1, and that friction surface, so that good cooling is obtained. In this disengaged configuration of the clutch, air also flows between the other friction liner and the friction surface of the reaction plate 2, because in practice the support disc which is provided on the friction disc 3 at its outer periphery, for fastening the friction liners on either side of the said support disc, is provided with passages for this purpose.

The pressure plate 1 is made of a mouldable material, and in this example it is in the form of a casting. The ventilation ribs 17, the projecting elements 18, the ears 12 and the fins 30 are all integral with the pressure plate 1, being formed by casting with the latter.

The fins 30 have a generally rectangular cross section which in this example is square, with rounded corner portions joining the sides of the square together.

The fins 30 are generally in the form of pads, and their depth is smaller than their width. The depth of each fin 30 is such that it does not interfere with the friction disc 3. The fact that the number of fins 30 in this example is greater than the number of the ventilation ribs 17 derives from the fact that the ribs 17 carry the projecting elements 18, and the width of the projecting elements 18 must be great enough to provide a proper abutment for the diaphragm 6. In another version, the fins 30 could have a cross section in the form of a lozenge, or of any other suitable form.

In a clutch having the pressure plate 1 of FIG. 2, good cooling of the dry friction clutch is obtained in a simple and inexpensive way, without recourse being had to any coolant liquid. In a modified version, the clutch can of course be of the pull-to-release type, in which the Belleville ring portion of the diaphragm bears at its inner periphery on the projecting elements 18 of the pressure plate. In that case, disengagement of the clutch is obtained by the clutch release bearing pulling on the fingers of the diaphragm.

Similarly, although in FIG. 2 the fins 30 are symmetrical, in another version they could be asymmetrical.

In another modified version, the diaphragm may be replaced by a set of coil springs acting between the cover plate and the back face 16 of the pressure plate, with these springs being associated with declutching levers for the purpose of disengaging the clutch.

In general terms, the pressure plate has a front face formed with a machined friction surface, which is oriented generally transversely for cooperation with the friction disc (i.e. with the appropriate friction liner of the latter), together with a back or rear face which is oriented generally transversely for action thereon of axially acting resilient means such as a diaphragm or a set of coil springs. These various alternative arrangements are possible because the fins, such as the fins 30, provided on the pressure plate in accordance with the invention, are interposed at the inner periphery of the pressure plate. They can be made inexpensively and in a simple way by a moulding or casting process, because the inner periphery of the pressure plate is of annular form with a circular cross section.

It will be understood that the clutch may of course be of a multi-disc type, with more than one pressure plate and more than one friction disc, at least one of the pressure plates being formed with the fins such as the fins 30. The pressure plate may be coupled to the cover plate, for rotation with the latter, by means of radial lugs which penetrate, with an axial clearance, into grooves which are formed at the outer periphery of the cover plate in the skirt portion of the latter.

The deflection or tilting means which apply the diaphragm pivotally to the cover plate may be of any suitable kind whatsoever, and may include spacer bars.

The diaphragm may be mounted on the outside of the cover plate, and in some cases the ventilation ribs 17 may be omitted.

What is claimed is:

1. A dry friction clutch including:
   a pressure plate;
   a reaction plate;
   a friction disc interposed between the pressure plate and reaction plates;
   means mounting the pressure and the reaction plate for rotation together;
   means coupled with the pressure plate for relative axial movement between the pressure and reaction plates between an engaged position and a disengaged position of the clutch; and
   axially acting resilient means for engaging the pressure plate thereby controlling the relative axial movement, the pressure plate having a central hole defining an inner periphery of the pressure plate, a front face defining a friction surface for cooperation with the friction disc, and a back face for engagement by the resilient means, wherein the pressure plate further includes ventilating fins projecting radially inwardly and disposed on the inner periphery thereof, the ventilation fins are spaced apart circumferentially at regular intervals and define air flow channels therebetween.

2. A clutch according to claim 1, wherein the pressure plate is a casting, the said ventilating fins being formed integrally with it.

3. A clutch according to claim 2, wherein each said ventilating fin is of a symmetrical form.

4. A clutch according to claim 2, wherein each said ventilating fin has a rectangular profile with rounded corners.

5. A clutch according to claim 2, wherein each said ventilating fin is in the form of a pad having a width greater than its radial depth.

6. A dry friction clutch including:
   a pressure plate;
   a reaction plate;
   a friction disc interposed between the pressure plate and the reaction plate;

means mounting the pressure and the reaction plate for rotation together;

means coupled with the pressure plate for relative axial movement between the pressure and the reaction plate between an engaged position and a disengaged position of the clutch; and axially acting resilient means for engaging the pressure plate thereby controlling the relative axial movement, the pressure plate having a central hole defining an inner periphery of the pressure plate, a front face defining a friction surface for cooperation with the friction disc, and a back face for engagement by the resilient means, wherein the pressure plate further includes a plurality of first ventilating fins protecting radially inwardly and disposed on the inner periphery thereof, wherein the pressure plate is a casting integrally formed with the ventilating fins; and the pressure plate has a plurality of second ventilation ribs disposed on the back face, a number of the first ventilation ribs being greater than a number of the second ventilation ribs.

* * * * *